US008634602B2

(12) United States Patent
Wang et al.

(10) Patent No.: US 8,634,602 B2
(45) Date of Patent: Jan. 21, 2014

(54) ELECTRONIC DEVICE WITH A FUNCTION OF SEARCHING IMAGES BASED ON FACIAL FEATURE AND METHOD

(75) Inventors: Wen-Wu Wang, Shenzhen (CN); Tsung-Jen Chuang, New Taipei (TW); Shih-Fang Wong, New Taipei (TW)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/340,699

(22) Filed: Dec. 30, 2011

(65) Prior Publication Data

US 2013/0156276 A1    Jun. 20, 2013

(30) Foreign Application Priority Data

Dec. 14, 2011    (CN) .......................... 2011 1 0416801

(51) Int. Cl.
*G06K 9/00*    (2006.01)

(52) U.S. Cl.
USPC ............ 382/118; 382/115; 382/190; 382/276

(58) Field of Classification Search
USPC ................................ 382/115, 118, 190, 276
See application file for complete search history.

(56) References Cited

U.S. PATENT DOCUMENTS

| 5,859,921 | A  | * | 1/1999  | Suzuki ......................... 382/118 |
| 6,128,398 | A  | * | 10/2000 | Kuperstein et al. ........... 382/118 |
| 7,804,982 | B2 | * | 9/2010  | Howard et al. ................ 382/115 |
| 2003/0065525 | A1 | * | 4/2003 | Giacchetti et al. ................ 705/1 |
| 2004/0158724 | A1 | * | 8/2004 | Carr et al. ...................... 713/186 |
| 2004/0202382 | A1 | * | 10/2004 | Pilu ............................... 382/276 |
| 2004/0223630 | A1 | * | 11/2004 | Waupotitsch et al. ......... 382/118 |
| 2005/0129290 | A1 | * | 6/2005 | Lo et al. ......................... 382/124 |
| 2005/0210103 | A1 | * | 9/2005 | Rui et al. ....................... 709/204 |
| 2007/0122036 | A1 | * | 5/2007 | Kaneda et al. ................. 382/190 |
| 2009/0023422 | A1 | * | 1/2009 | MacInnis et al. ............. 455/411 |
| 2010/0118163 | A1 | * | 5/2010 | Matsugu et al. ......... 348/231.99 |

* cited by examiner

*Primary Examiner* — Vu Le
*Assistant Examiner* — Aklilu Woldemariam
(74) *Attorney, Agent, or Firm* — Altis Law Group, Inc.

(57) ABSTRACT

An electronic device with a function of searching images based on a facial feature is provided. The electronic device includes a capturing unit, a storage unit, an acquiring module, a searching module, and a folder establishing module. The capturing unit captures facial images. The storage unit stores a plurality of images. The acquiring module acquires facial features of the facial image captured by the capturing unit. The searching module searches for images that include the acquired facial feature from the plurality of images stored in the storage unit. The folder establishing module establishes a new folder and stores the searched images to the established new folder.

4 Claims, 2 Drawing Sheets

ELECTRONIC DEVICE WITH A FUNCTION OF SEARCHING IMAGES BASED ON FACIAL FEATURE AND METHOD

BACKGROUND

1. Technical Field

The present disclosure relates to electronic devices and, particularly, to an electronic device with a function of searching images based on a facial feature and a method for searching images based on a facial feature.

2. Description of Related Art

It is difficult and time-consuming for users to find images which include a predetermined facial feature from a large amount of images. In addition, it is necessary for the user to encrypt the found images to prevent the found images being seen by other people.

Therefore, what is needed is an electronic device to overcome the described limitations.

DETAILED DESCRIPTION

Figure 1:
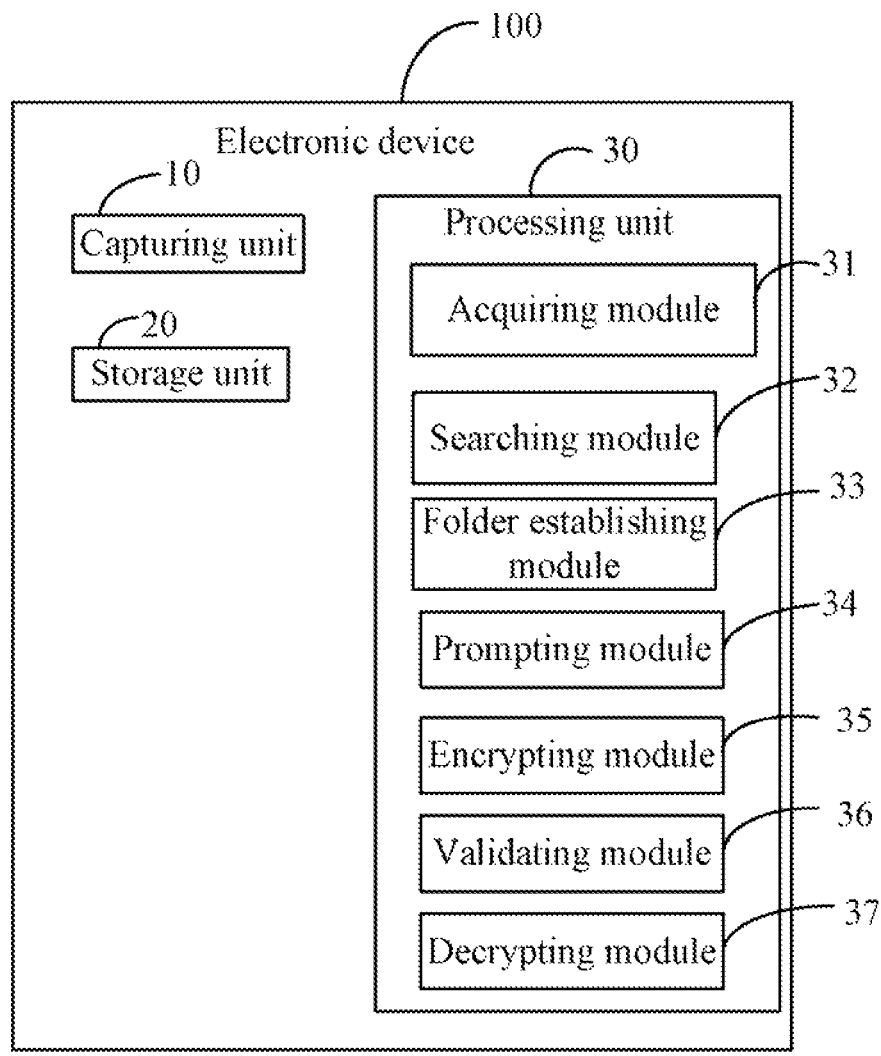
FIG. 1 is a block diagram of the hardware infrastructure of an electronic device with a function of searching images based on a facial feature, in accordance with an exemplary embodiment.

FIG. 1 shows an electronic device 100 with a function of searching images based on facial features. The electronic device 100 includes a capturing unit 10, a storage unit 20, and a processing unit 30.

The capturing unit 10 captures facial images. The storage unit 20 stores a number of images. In one embodiment, the capturing unit 10 is a camera.

The processing unit 30 includes an acquiring module 31, a searching module 32, and a folder establishing module 33.

The acquiring module 31 acquires a facial feature of a facial image captured by the capturing unit 10. In one embodiment, the facial feature of the facial image may be a facial shape, a facial size, a facial proportion, or a combination thereof. Technology for acquiring the facial feature from the facial image is well known technology, and there is no need to describe it in detail in the present disclosure.

The searching module 32 searches images that include the acquired facial feature from the number of images stored in the storage unit 20.

The folder establishing module 33 establishes a new folder which is used to store the searched images by the searching module 32.

The processing unit 30 further includes a prompting module 34 and an encrypting module 35. The prompting module 34 prompts a user whether to encrypt the new folder. The encrypting module 35 takes the acquired facial feature as an encryption key to encrypt the new folder when the user selects to encrypt the new folder, thereby preventing the searched image from being seen by other people.

The processing unit 30 further includes a validating module 36 and a decrypting module 37. The validating module 36 prompts the user to input a facial image when the user wants to open the encrypted folder. The acquiring module 31 acquires the facial feature of the facial image in response to an image input operation from the user. The validating module 36 further validates whether the acquired facial feature is consistent with the encryption key for encrypting the folder. The decrypting module 37 decrypts the encrypted folder when the acquired facial feature is consistent with the encryption key for encrypting the folder.

Figure 2:
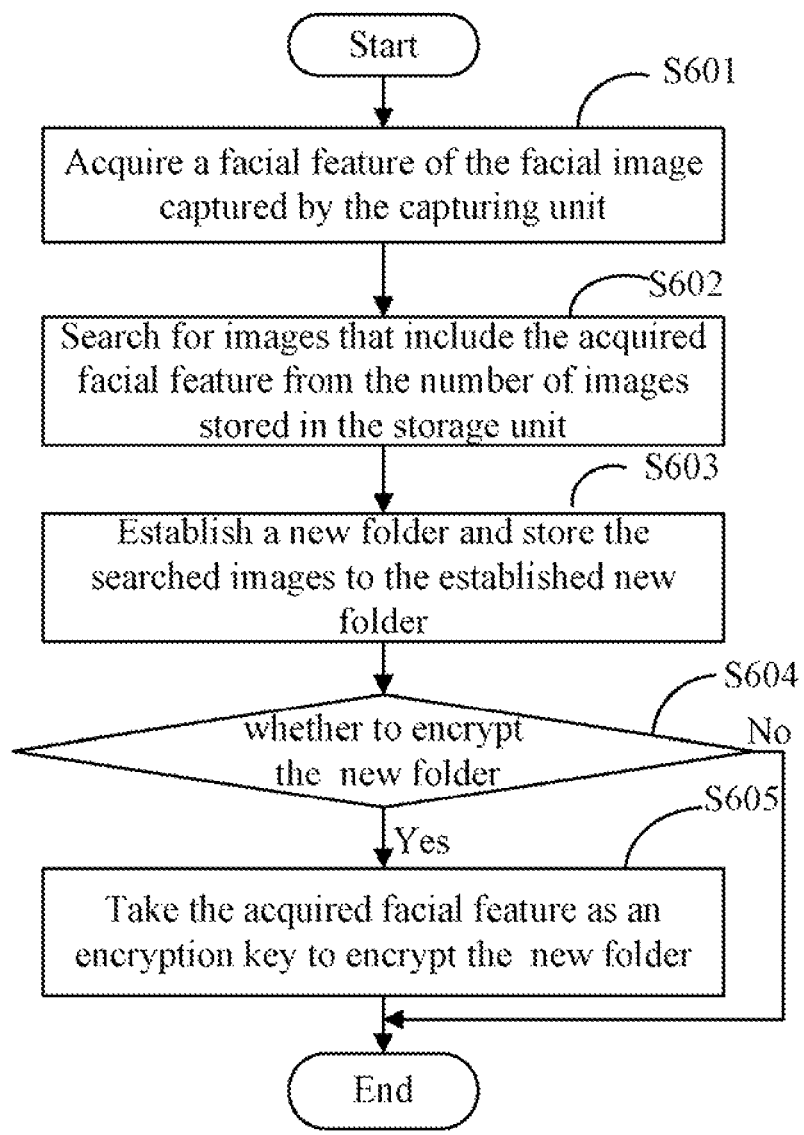
FIG. 2 is a flowchart of a method for searching images based on a facial feature implemented by the electronic device of FIG. 1, in accordance with an exemplary embodiment.

FIG. 2 is a flowchart of a method for searching images based on a facial feature implemented by the electronic device of FIG. 1, in accordance with an exemplary embodiment.

In step S601, the acquiring module 31 acquires the facial feature of the facial image captured by the capturing unit 10.

In step S602, the searching module 32 searches for images that include the acquired facial feature from the number of images stored in the storage unit 20.

In step S603, the folder establishing module 33 establishes a new folder and stores the searched images to the established new folder.

In step S604, the prompting module 34 prompts a user whether to encrypt the new folder, if yes, the procedure goes to step S605, if no, the procedure goes end.

In step S605, the encrypting module 35 takes the acquired facial feature as an encryption key to encrypt the new folder.

The method further includes steps as follows: the validating module 36 prompts the user to input a facial image when the user wants to open the encrypted folder. The acquiring module 31 acquires the facial feature of the facial image in response to an image input operation from the user. The validating module 36 further validates whether the acquired facial feature is consistent with the encryption key for encrypting the folder, and the decrypting module 37 decrypts the encrypted folder when the acquired facial feature are consistent with the encryption key for encrypting the folder.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. An electronic device with a function of searching images based on a facial feature comprising:
   a capturing unit configured to capture facial images;
   a storage unit configured to store a plurality of images;
   an acquiring module configured to acquire a facial feature of the facial image captured by the capturing unit;
   a searching module configured to search for images that include the acquired facial feature from the plurality of images stored in the storage unit;
   a folder establishing module configured to establish a new folder and store the searched images to the established new folder;
   a prompting module configured to prompt a user whether to encrypt the new folder; and
   an encrypting module configured to take the acquired facial feature as an encryption key to encrypt the new folder when the user selects to encrypt the new folder;
   a validating module configured to prompt the user to input a facial image when the user wants to open the encrypted folder; and
   a decrypting module configured to decrypt the encrypted folder when the acquired facial feature is consistent with the encryption key,
   wherein the acquiring module is further configured to acquire the facial feature of the facial image in response an image input operation from the user; and the validating module is further configured to validate whether the acquired facial feature is consistent with the encryption key for encrypting the folder.

2. The electronic device as described in claim 1, wherein the facial feature of the facial image is a facial shape, a facial size, a facial proportion, or a combination thereof.

3. A method for searching images based on a facial feature implemented by an electronic device, wherein the electronic device comprises a capturing unit and a storage unit, the capturing unit is configured to capture facial images, the storage unit is configured to store a plurality of images, the method comprising:

acquiring a facial feature of the facial image captured by the capturing unit;

searching for images that include the acquired facial feature from the plurality of images stored in the storage unit;

establishing a new folder;

storing the searched images to the established new folder;

prompting a user whether to encrypt the new folder; and taking the acquired facial feature as an encryption key to encrypt the new folder when the user selects to encrypt the new folder;

prompting the user to input a facial image when the user wants to open the encrypted folder;

acquiring the facial feature of the facial image in response an image input operation from the user;

validating whether the acquired facial feature is consistent with the encryption key for encrypting the folder; and decrypting the encrypted folder when the acquired facial feature is consistent with the encryption key for encrypting the folder.

4. The method as described in claim 3, wherein the facial feature of the facial image is a facial shape, a facial size, a facial proportion, or a combination thereof.

\* \* \* \* \*